(12) United States Patent
Register et al.

(10) Patent No.: US 10,408,423 B2
(45) Date of Patent: Sep. 10, 2019

(54) ULTRAVIOLET CURING SYSTEM AND METHOD

(71) Applicant: THE BOEING COMPANY, Chicago, IL (US)

(72) Inventors: Justin Register, Charleston, SC (US); David Reed, Charleston, SC (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 15/187,894

(22) Filed: Jun. 21, 2016

(65) Prior Publication Data

US 2017/0361503 A1 Dec. 21, 2017

(51) Int. Cl.
| | |
|---|---|
| *F21V 7/00* | (2006.01) |
| *B29C 35/08* | (2006.01) |
| *B29C 70/54* | (2006.01) |
| *F21V 21/30* | (2006.01) |
| *F21V 7/16* | (2006.01) |
| *F21V 7/18* | (2006.01) |
| *F21V 21/40* | (2006.01) |
| *B29C 70/00* | (2006.01) |
| *B29C 70/28* | (2006.01) |
| *B29C 37/00* | (2006.01) |
| *B29L 31/30* | (2006.01) |

(52) U.S. Cl.
CPC ........ *F21V 7/0083* (2013.01); *B29C 35/0805* (2013.01); *B29C 70/00* (2013.01); *B29C 70/28* (2013.01); *B29C 70/54* (2013.01); *F21V 7/16* (2013.01); *F21V 7/18* (2013.01); *F21V 21/30* (2013.01); *F21V 21/40* (2013.01); *B29C 2035/0827* (2013.01); *B29C 2037/903* (2013.01); *B29L 2031/3076* (2013.01); *B29L 2031/3085* (2013.01)

(58) Field of Classification Search
CPC ............ B29C 2035/0827; F21V 21/30; F21V 7/0083; F21V 7/16; F21V 7/18
See application file for complete search history.

(56) References Cited

U.S. PATENT DOCUMENTS

| | | | | |
|---|---|---|---|---|
| 1,667,775 A | * | 5/1928 | Edmands | A61F 7/007 219/525 |
| 1,702,028 A | * | 2/1929 | Blanchard | A61N 5/06 219/537 |
| 2,619,585 A | * | 11/1952 | Peters | F21V 17/02 362/322 |
| 3,648,706 A | * | 3/1972 | Holzer | A61N 5/06 250/494.1 |
| 3,819,929 A | * | 6/1974 | Newman | B41F 23/0409 362/218 |

(Continued)

*Primary Examiner* — Benjamin A Schiffman

(74) *Attorney, Agent, or Firm* — Joseph M. Butscher; The Small Patent Law Group, LLC

(57) ABSTRACT

An ultraviolet (UV) curing system is configured to cure a composite structure. The UV curing system includes a plurality of UV light assemblies that are configured to adaptively conform to a shape of the composite structure. A UV curing method is configured to cure a composite structure. The UV curing method includes positioning a UV curing system on the composite structure, and adaptively conforming a plurality of UV light assemblies of the UV curing system to a shape of the composite structure.

29 Claims, 3 Drawing Sheets

(56) References Cited

U.S. PATENT DOCUMENTS

| | | | | |
|---|---|---|---|---|
| 5,231,770 A * | 8/1993 | Fertig | ................... | A45D 20/20 |
| | | | | 219/415 |
| 6,206,548 B1 * | 3/2001 | Lassovsky | .............. | F21S 8/026 |
| | | | | 362/217.05 |
| 6,430,365 B1 * | 8/2002 | Shimizu | ................. | A45D 20/20 |
| | | | | 34/266 |
| 6,442,340 B1 * | 8/2002 | Shimizu | ................. | A45D 20/20 |
| | | | | 34/266 |
| 6,443,595 B1 * | 9/2002 | Tseng | ....................... | F21S 4/20 |
| | | | | 362/249.07 |
| 6,666,224 B2 * | 12/2003 | Lee | ......................... | A45B 3/04 |
| | | | | 135/16 |
| 8,357,878 B2 | 1/2013 | Leonhardt | | |
| 8,662,705 B2 * | 3/2014 | Roberts | .................... | A61L 2/10 |
| | | | | 362/249.02 |
| 2011/0253045 A1 * | 10/2011 | Bensen | ................. | D21H 19/14 |
| | | | | 118/668 |
| 2012/0161039 A1 | 6/2012 | Yoon | | |

* cited by examiner

ULTRAVIOLET CURING SYSTEM AND METHOD

FIELD OF THE DISCLOSURE

Embodiments of the present disclosure generally relate to ultraviolet curing systems and methods that are used to cure composite structures, and, more particularly, to ultraviolet curing systems and methods that are configured to adaptively conform to shapes of composite structures.

BACKGROUND OF THE DISCLOSURE

Various structural components are used to form a typical aircraft. For example, wing and empennage surfaces of an aircraft typically include stringers that are coupled to skin members on the wing and empennage surfaces that cooperatively provide a desired flexural and torsional stiffness to the wing and empennage surfaces.

Aircraft structures may be formed from composite materials, which are generally reinforced polymer-based materials used in place of metals, particularly in applications in which relatively low weight and high mechanical strength is desired. Accordingly, composite materials are widely used in a variety of commercial and military aircraft, terrestrial vehicles and consumer products.

A composite material typically includes a network of reinforcing fibers that are generally applied in layers, and a polymeric resin that substantially wets the reinforcing fibers to form a binding contact between the resin and the reinforcing fibers. The composite material may then be formed into a structural component by a variety of known forming methods, such as an extrusion process or other forming processes.

In an aircraft, a stringer may be used to transfer bending loads in skin panels, and stiffen the skin panels in order to prevent buckling, for example. The stringers and skin panels may be made of composite materials, such as carbon fiber reinforced plastic (CFRP). A composite stringer may be fabricated from multiple plies of reinforcing fibers.

After a composite structure is initially formed, the composite structure may be cured, such as within an autoclave. Various structures that are used to form an aircraft have arcuate and/or irregular shapes. The composite structures are typically positioned on or within molds during a curing process. Often, the molds are also formed of composite materials. As such, the molds themselves are cured. However, because the molds may have irregular and/or arcuate shapes, the molds may be unevenly cured. For example, a flat surface of the mold may be evenly cured, but curved portions of the mold may be unevenly cured due to the curing device (such as a lamp) being spaced a different distance from the cured portion than the flat surface.

SUMMARY OF THE DISCLOSURE

A need exists for an efficient and effective system and method of curing a composite material. A need exists for an efficient and effective system and method of curing a composite mold that is configured to support a composite structure (such as a stringer) during a subsequent forming and/or curing process.

With those needs in mind, certain embodiments of the present disclosure provide an ultraviolet (UV) curing system that is configured to cure a composite structure. The UV curing system includes a plurality of UV light assemblies that are configured to adaptively conform to a shape of the composite structure.

Each of the plurality of UV light assemblies may include a housing coupled to a UV light emitter. At least one pivot beam (for example, at least one first pivot beam) may be pivotally coupled between housings of at least two of the plurality of UV light assemblies. At least one pivot beam (for example, at least one second pivot beam) may be pivotally coupled between at least one housing of the plurality of UV light assemblies and a carrier bracket. In at least one embodiment, the carrier bracket includes a handle.

A flexible drape may be positioned over and between at least portions of the plurality of UV light assemblies. The flexible drape includes a reflecting interior surface and a light-blocking exterior surface.

Spacing caps may be coupled to the plurality of UV light assemblies. The spacing caps are configured to space the plurality of UV light assemblies from the composite structure a defined distance. In at least one embodiment, the spacing caps are shaped as circular disks. At least one of the spacing caps includes an annular ridge. At least one other of the spacing caps includes an annular groove that is configured to receive and retain at least a portion of the annular ridge. The UV curing system may also include a retainer that is configured to couple to protuberances extending from the spacing caps in order to securely retain the plurality of UV light assemblies in a fixed position.

The UV curing system may include at least three UV light assemblies. Each of the plurality of UV light assemblies may be configured to emit UVB light energy into the composite structure.

Certain embodiments of the present disclosure provide a UV curing method that is configured to cure a composite structure. The UV curing method includes positioning a UV curing system on the composite structure, and adaptively conforming a plurality of UV light assemblies of the UV curing system to a shape of the composite structure.

The method may include pivotally coupling at least two of the plurality of UV light assemblies together through at least one pivot beam. The method may include pivotally coupling at least one of the plurality of UV light assemblies to a carrier bracket through at least one pivot beam.

In at least one embodiment, the UV curing method includes reflecting UV light energy into the composite structure with a reflecting interior surface of a drape positioned over and between at least portions of the plurality of UV light assemblies, and blocking the UV light energy from emission into an environment surrounding the UV curing system with a light-blocking surface of the drape.

In at least one embodiment, the UV curing method includes coupling spacing caps to the plurality of UV light assemblies, and spacing the plurality of UV light assemblies a defined distance from the composite structure via the spacing caps.

The UV curing method may include coupling a retainer to protuberances extending from the spacing caps, and securely retaining the plurality of UV light assemblies in a fixed position through the coupling.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an ultraviolet curing system that is configured to provide proper ultraviolet energy to a contoured structure during a curing process. The ultraviolet curing system includes a plurality of ultraviolet light assemblies that are configured to adaptively conform to a shape of a structure. The ultraviolet light assemblies adapt to a shape of a structure such that they may be spaced a proper curing distance from surfaces of the structure. In this manner, the ultraviolet curing system ensures a proper dosage of ultraviolet curing energy into the structure. In at least one embodiment, the ultraviolet light assemblies are configured to emit ultraviolet light energy at a UVB wavelength, such as between 280-315 nm.

The ultraviolet curing system may be configured to cure an epoxy of a composite structure. The fully-cured composite structure may be used as a mold or other such tool that receives and retains another composite structure during a forming and/or curing process.

Figure 1:
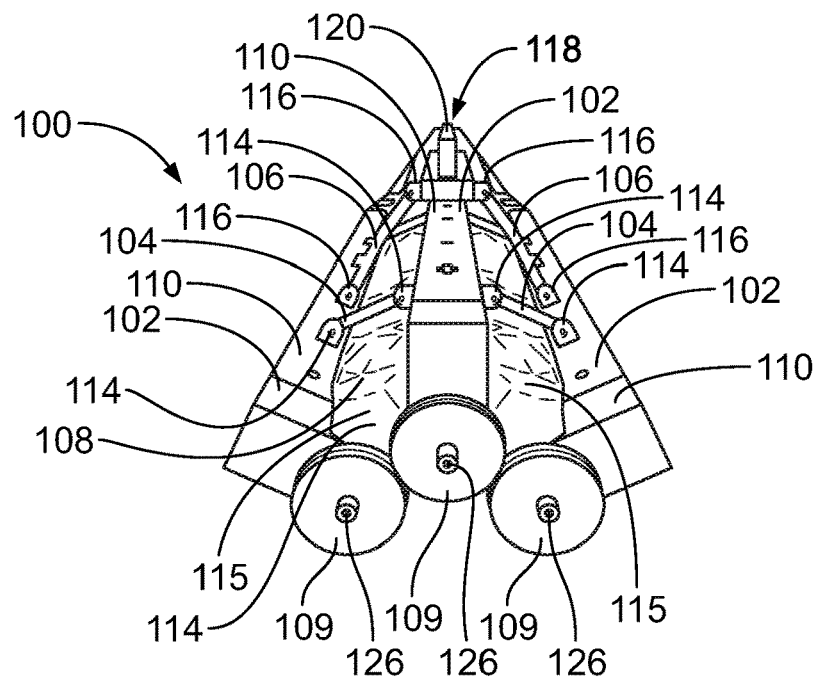
FIG. 1 is a diagrammatic representation of a perspective top end view of an ultraviolet curing system, according to an embodiment of the present disclosure.

FIG. 1 is a diagrammatic representation of a perspective top end view of an ultraviolet (UV) curing system 100, according to an embodiment of the present disclosure. The UV curing system 100 includes a plurality of UV light assemblies 102 adaptively coupled together through a plurality of pivot beams 104 and 106. The pivot beams 104 may be sized and/or shaped differently than the pivot beams 106. For example, the pivot beams 106 may be longer than the pivot beams 104. In at least one other embodiment, the pivot beams 104 and 106 may have the same size and shape. A drape 108 is positioned over and between the UV light assemblies 102. Spacing caps 109 are coupled to the UV light assemblies 102.

As shown, the UV curing system 100 includes three UV light assemblies 102 that are configured to adaptively move in relation to one another to conform to a surface of a composite structure that is to be cured. Optionally, the UV curing system 100 may include more than three UV light assemblies 102. For example, the UV curing system 100 may include four, five, six, or more UV light assemblies 102 that are adaptively coupled together.

Figure 2:
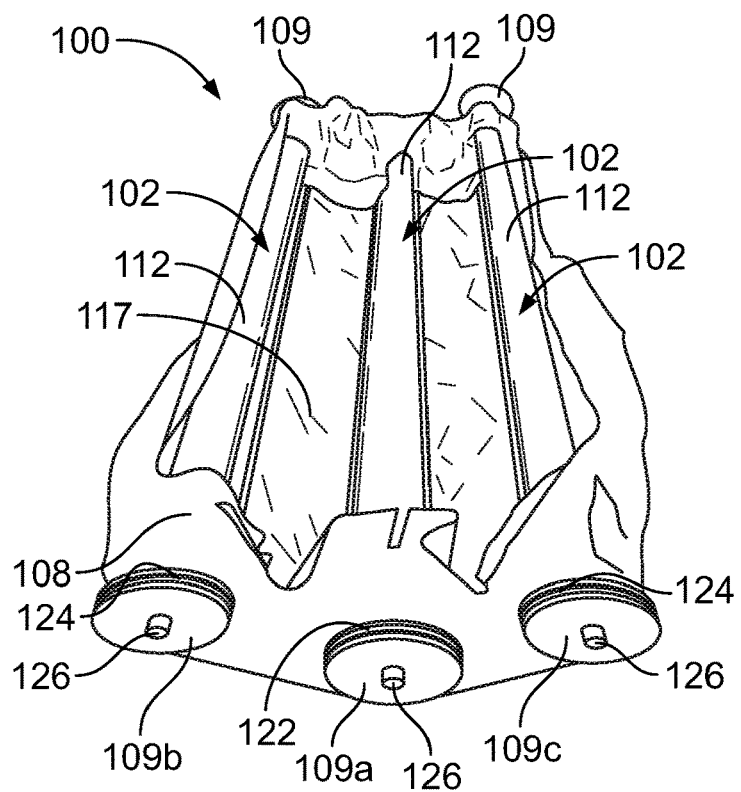
FIG. 2 is a diagrammatic representation of a perspective bottom end view of an ultraviolet curing system, according to an embodiment of the present disclosure.

FIG. 2 is a diagrammatic representation of a perspective bottom end view of the UV curing system 100. Referring to FIGS. 1 and 2, the UV light assemblies 102 include housings 110 coupled to UV light emitters 112. The housings 110 contain electronics (which may include circuit boards, for example) that are configured to provide power to and control operation of the UV light emitters 112. The UV light emitters 112 include one more UV light emitting devices, such as light emitting diodes, bulbs, and/or the like, that are configured to emit UV light energy. In at least one embodiment, the UV light emitters 112 are configured to emit UVB light energy, such as having a wavelength of 280-315 nm. The UVB light energy is used to cure epoxy within a composite structure. It has been found that UVB light energy is particularly well-suited to cure a composite structure that may be later used as a mold to support another composite structure (such as a stringer used in an aircraft) during a subsequent curing operation (such as a curing process within an autoclave). Alternatively, the UV light emitters 112 may be configured to emit other types of UV light energy, such as UVA, UVC, near ultraviolet, middle ultraviolet, far ultraviolet, vacuum ultraviolet, or extreme ultraviolet light energy. In at least one other embodiment, the light emitters 112 may be configured to emit other types of light energy other than UV light energy.

The drape 108 may be formed of a flexible fabric. The drape 108 includes a light-blocking exterior surface 115 and a reflecting interior surface 117. The light-blocking exterior surface 115 may be a flexible, dark (such as black) fabric that blocks UV light energy from passing therethrough. The reflecting interior surface 117 may be formed of a flexible reflective material (for example, a mirrored, metalized, or light colored fabric material) that is configured to reflect UV light. Accordingly, as the UV light emitters 112 emit UV light energy, the reflecting interior surface 117 reflects the emitted UV light energy down, while the light-blocking exterior surface 115 prevents, minimizes, or otherwise reduces the UV light energy from passing therethrough. In this manner, the light-blocking exterior surface 115 protects individuals in an environment proximate to the UV curing system 100 from UV exposure. In at least one embodiment, the light-blocking exterior surface 115 may have a color that absorbs UV light energy. Alternatively, the UV curing system 100 may not include the drape 108. In at least one embodiment, the drape 108 may include a reflecting drape and a separate and distinct light-blocking drape.

Figure 3:
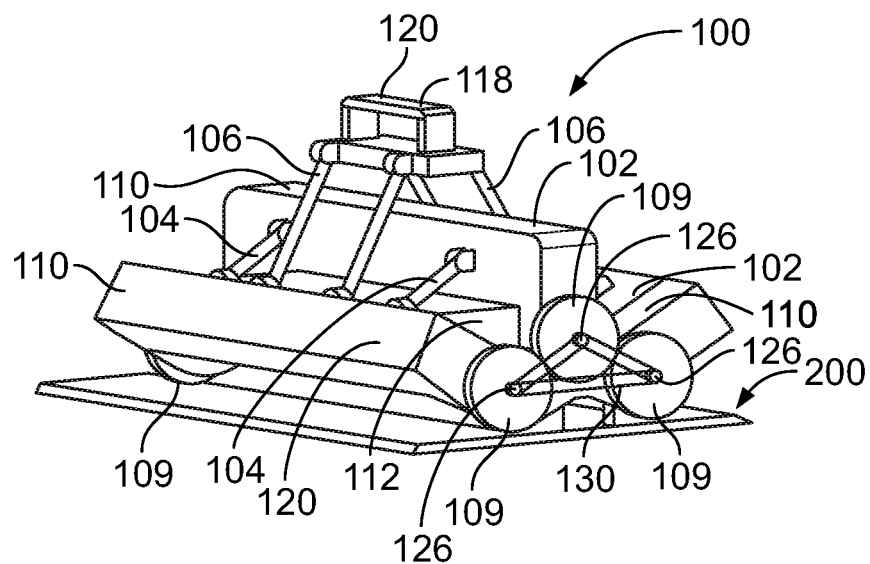
FIG. 3 is a diagrammatic representation of a perspective lateral view of an ultraviolet curing system positioned over a composite structure, according to an embodiment of the present disclosure.

The pivot beams 104 are pivotally coupled to neighboring UV light assemblies 102. For example, the housings 110 may include hinges 114 secured thereto. The pivot beams 104 are pivotally coupled to axially aligned (that is positioned at similar or the same positions in relation to longitudinal axes of the housings 110) hinges 114. Similarly, the pivot beams 106 are pivotally coupled to hinges 114 extending from housings 110 to axially aligned hinges 116 extending from a carrier bracket 118, which may include a handle 120 (which allows an individual to easily carry the UV curing system 100 between locations, as shown in FIG. 3). The pivotal coupling of the pivot beams 104 between the housings 110 and the pivotal coupling of the pivot beams 106 between the housings 110 and the carrier bracket 118 allow the UV light assemblies 102 to radially extend or contract relative to one another. The UV curing system 100 may include more or less pivot beams 104 and 106 than shown. For example, in at least one embodiment, the UV curing system 100 may not include the pivot beams 106 and the carrier bracket 118.

The spacing caps 109 are positioned on opposite ends of the UV light assemblies 102. For example, opposed spacing caps 109 may be secured to opposite ends of each UV light emitter 112 and/or to brackets coupled to the UV light emitter 112 and/or the housing 110. The spacing caps 109 may be shaped as circular disks, and are configured to cooperate to space the UV light emitters 112 a desired and consistent distance from a surface of a composite structure to be cured.

The spacing caps 109 secured to a UV light emitter 112 may be coaxial with the UV light emitter 112. The diameter of the spacing caps 109 may be greater than the diameter the UV light emitter 112. As such, the spacing caps 109 may contact a surface of a structure, and suspend the UV light emitter 112 above the surface of the structure.

As shown in FIG. 2, in particular, a middle spacing cap 109a may include an annular ridge 122 extending around an outer circumference. Each of the lateral spacing caps 109b and 109c may include an annular groove 124 extending around a circumference thereof. The annular groove 124 is reciprocally sized and shaped in comparison to the annular ridge 122. The annular groove 124 is configured to receive and retain a portion of the annular ridge 122 in order to axially secure the caps 109 together (and therefore the UV light assemblies 102 together). Optionally, the middle spacing cap 109a may include the annular channel, while the lateral spacing caps 109b and 109c may include an annular ridge. In at least one other embodiment, the spacing caps 109a, 109b, and 109c may not include an annular ridge or an annular channel, but instead may include a smooth, contiguous outer circumferential surface. In at least one other embodiment, the spacing caps 109a, 109b, and 109c may include one or more pins that are configured to fit into grooves, or vice versa.

Each spacing cap 109 may also include a coupling protuberance 126 outwardly extending from a center thereof. The coupling protuberance 126 may be or include a post, stud, barb, nub, hub, and/or the like that is configured to couple to a retainer (not shown in FIGS. 1 and 2) that is configured to securely retain the UV light assemblies 102 in a desired orientation. Alternatively, the spacing caps 109 may not include the coupling protuberances, and the UV curing system 100 may not include the retainer.

The spacing caps 109 may be sized and shaped to space the UV light emitters 112 a specified distance from a structure. For example, the spacing caps 109 may be sized and shaped to space each UV light emitter 112 a distance of one inch from a structure that is to be cured. It has been found that a distance of one inch from a composite structure allows the UV light emitters 112 to emit UVB light energy into the composite structure in order to provide an efficient, safe, effective, and proper dosage of UVB light energy during a curing process. Alternatively, the spacing caps 109 may be sized and shaped to provide a separation distance between the UV light emitters 112 and the composite structure that is greater or less than one inch.

In at least one embodiment, the UV curing system 100 may include one or more structures, devices, or the like that are configured to secure the UV curing system 100 to a composite structure to be cured. For example, the UV curing system 100 may include suction cups that are configured to temporarily couple the UV curing system to a structure, via suction force.

Figure 4:
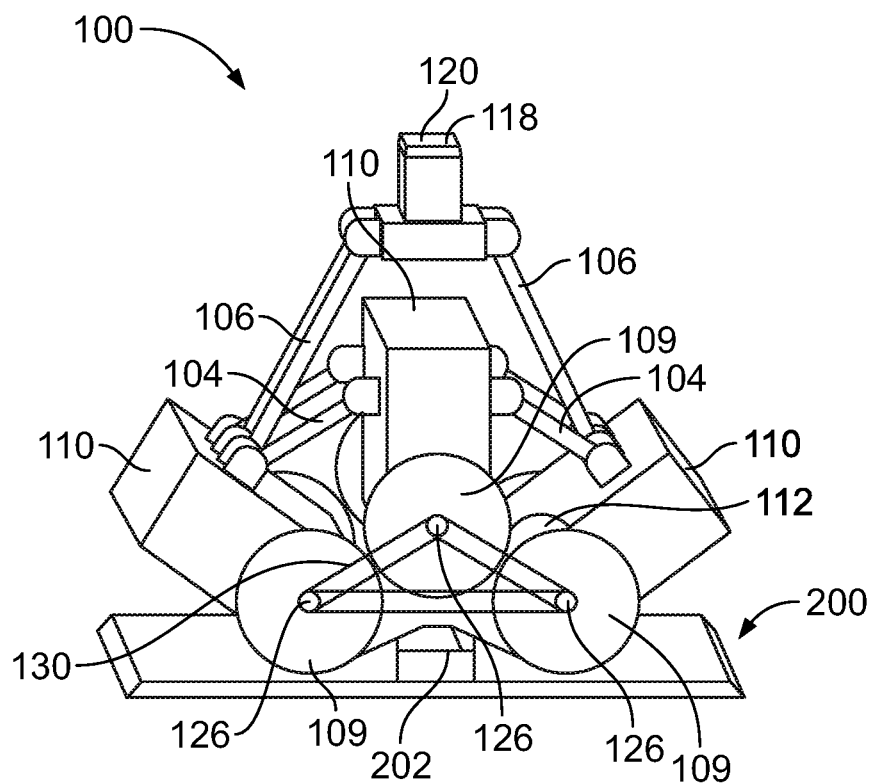
FIG. 4 is a diagrammatic representation of a perspective end view of an ultraviolet curing system positioned over a composite structure, according to an embodiment of the present disclosure.

FIG. 3 is a diagrammatic representation of a perspective lateral view of the UV curing system 100 positioned over a composite structure 200 according to an embodiment of the present disclosure. FIG. 4 is a diagrammatic representation of a perspective end view of the UV curing system 100 positioned over the composite structure 200. For the sake of clarity, the drape 108 is not shown in FIGS. 3 and 4.

Referring to FIGS. 3 and 4, the composite structure 200 may include a network of reinforcing fibers that are generally applied in layers, and an epoxy that substantially wets the reinforcing fibers to form a binding contact between the epoxy and the reinforcing fibers. The UV curing system 100 is configured to emit UV light energy (such as UVB light energy) into the composite structure 200 to cure the epoxy.

The composite structure 200 may include at least one contoured surface 202, such as an arcuate bulge, depression, and/or the like. The composite structure 200 may be formed and cured to be a mold that is used to support another composite structure (such as a stringer) during a subsequent forming and/or curing process.

As shown, the spacing caps 109 couple together to conform to an outer surface of the composite structure 200. The pivot beams 104 and 106 allow the UV light assemblies 102 to adjustably move in relation to the composite structure 200, so that the UV light emitters 112 are at a consistent spacing from surfaces of the composite structure 200. The spacing caps 109 and the pivot beams 104 and 106 allow the UV curing system 100 to adapt to the contours of the composite structure. Accordingly, the UV curing system 100 adaptively couples to a structure, such as the composite structure 200, so that the UV light emitters 112 are at a desired or otherwise defined distance to the composite structure 200. The desired distance may be a distance that provides a proper curing distance for an effective curing dosage of UVB light energy onto and into the composite structure 200.

One or more retainers 130 may secure to the protuberances 126 of the spacing caps 109. The retainers 130 may be elastic bands (such as rubber bands) that axially secure the spacing caps 109 (and therefore the UV light assemblies 102) together. As such, when the UV curing system 100 is positioned on the composite structure 200, the retainers 130 ensure that the UV light assemblies 102 remain in a fixed position during a curing process. In at least one other embodiment, instead of elastic bands, the retainers 130 may be or include one or more latches, claps, tabs, slots, and/or the like that securely couple the spacing caps 109 together.

Figure 5:
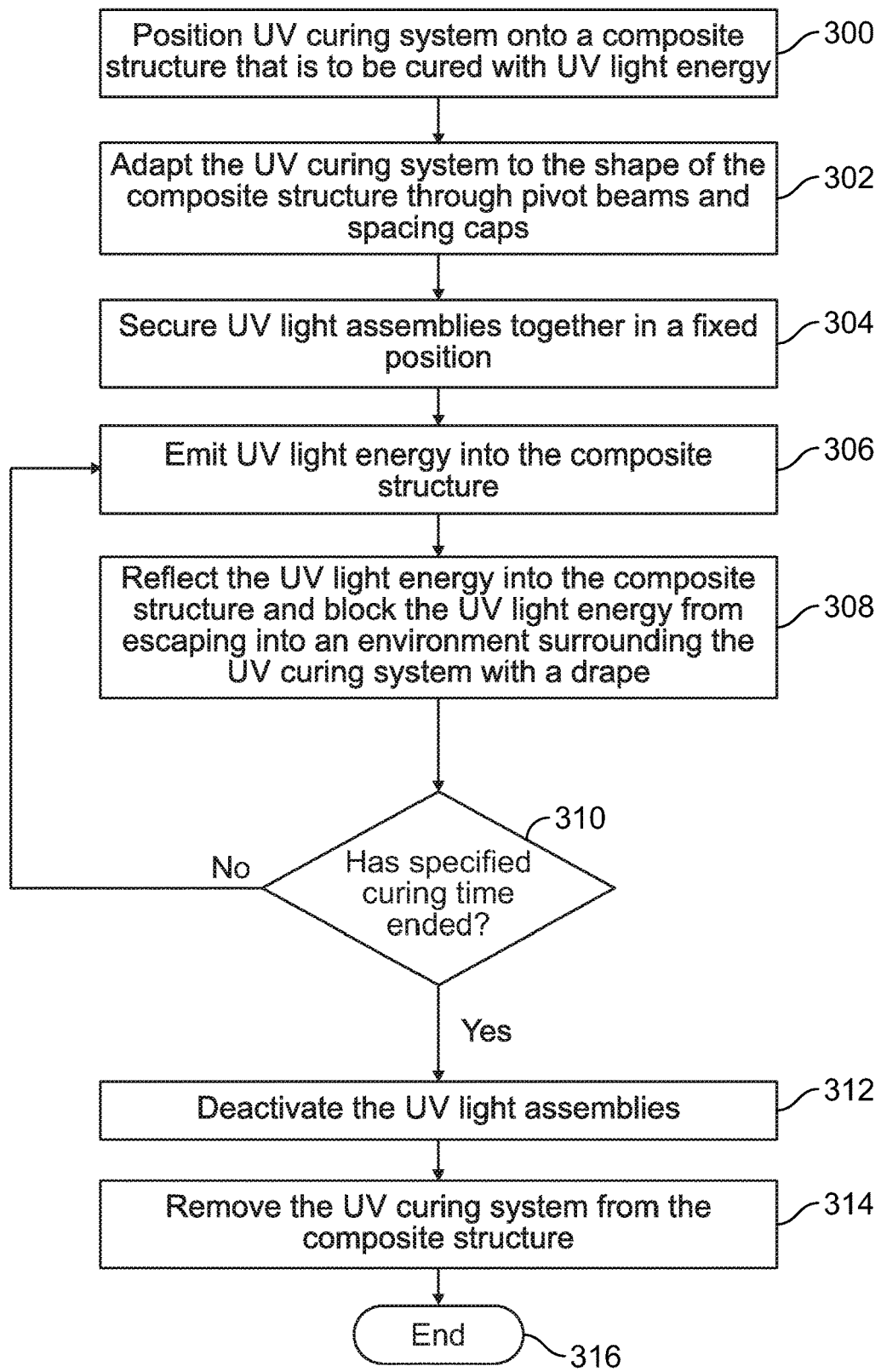
FIG. 5 illustrates a flow chart of a method of using a UV curing system to cure a composite structure, according to an embodiment of the present disclosure.

FIG. 5 illustrates a flow chart of a method of using a UV curing system to cure a composite structure, according to an embodiment of the present disclosure. Referring to FIGS. 1-5, the method begins at 300, at which the UV curing system 100 is positioned onto the composite structure 200, which is to be cured with UV light energy. After being positioned on the composite structure 200, the UV curing system 100 adapts to the shape of the composite structure 200 via the pivot beams 104 and/or 106 and the spacing caps 109 at 302.

After the UV curing system 100 adapts to the shape of the composite structure, at 304 the UV light assemblies 102 may be secured together in a fixed position. For example, one or more retainers 130 may couple to the protuberances 126 of the spacing caps 109 to prevent, minimize, or otherwise reduce the UV light assemblies 102 from shifting in relation to one another. Alternatively, the method may not include 304.

At 306, UV light energy is emitted into the composite structure 200. For example, the UV light emitters 112 may be operated to emit UVB light energy into the composite structure 200.

At 308, the UV light energy is reflected into the composite structure and is also blocked from escaping into an environment surrounding the UV curing system 100 with the drape 108. Alternatively, the method may not include 308.

At 310, it is determined whether a specified curing time has ended. For example, an individual may determine a desired curing time. Optionally, one or more of the UV light assemblies 102 may include a control unit that controls the UV curing cycle based on data stored in a memory.

If the curing time has not ended, the method returns to 306 from 310. If, however, the curing time has ended, the UV light assemblies 102 are deactivated at 312. Then, at 314, the UV curing system 100 is removed from the composite structure 200 (or vice versa). The method then ends at 316.

As noted above, one or more of the UV light assemblies 102 may include a control unit that is configured to control operation of the UV curing system 100. For example, the control unit of at least one UV light assembly 102 may be contained within a housing 110 and configured to operate one or more UV light emitters 112 based on a curing time, which may be stored in a memory.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, one or more of the UV light assemblies 102 may include a control unit having one or more processors that are configured to control operation of the UV light emitters 112.

The control unit is configured to execute a set of instructions that are stored in one or more storage elements (such as one or more memories), in order to process data. For example, the control unit may include or be coupled to one or more memories. The storage elements may also store data or other information as desired or needed. The storage elements may be in the form of an information source or a physical memory element within a processing machine.

The set of instructions may include various commands that instruct the control unit as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, EPROM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, OTP (One Time Programmable) memory, and non-volatile RAM (NVRAM) memory. The above memory types are exemplary only, and are thus not limiting as to the types of memory usable for storage of a computer program.

As described above, embodiments of the present disclosure provide efficient and effective systems and methods of curing a composite material. Certain embodiments of the present disclosure provide efficient and effective systems and methods of curing a composite mold that is configured to support a composite structure (such as a stringer) during a subsequent forming and/or curing process.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An ultraviolet (UV) curing system that is configured to cure a composite structure, the UV curing system comprising:
    a plurality of UV light assemblies that adaptively conform to a shape of the composite structure; and
    spacing caps shaped as circular disks coupled to the plurality of UV light assemblies, wherein the spacing caps are configured to space the plurality of UV light assemblies from the composite structure a defined distance,
    wherein at least one of the spacing caps includes an annular ridge, and wherein at least one other of the spacing caps includes an annular groove that is configured to receive and retain at least a portion of the annular ridge.

2. The UV curing system of claim 1, wherein each of the plurality of UV light assemblies comprises a housing coupled to a UV light emitter.

3. The UV curing system of claim 2, further comprising at least one pivot beam that is pivotally coupled between housings of at least two of the plurality of UV light assemblies.

4. The UV curing system of claim 2, further comprising at least one pivot beam that is pivotally coupled between at least one housing of the plurality of UV light assemblies and a carrier bracket.

5. The UV curing system of claim 4, wherein the carrier bracket comprises a handle.

6. The UV curing system of claim 1, further comprising a flexible drape positioned over and between at least portions of the plurality of UV light assemblies, wherein the flexible drape comprises at least one of a reflecting interior surface and a light-blocking exterior surface.

7. The UV curing system of claim 1, further comprising a retainer that is configured to couple to protuberances extending from the spacing caps in order to securely retain the plurality of UV light assemblies in a fixed position.

8. The UV curing system of claim 1, wherein the plurality of UV light assemblies comprises at least three UV light assemblies.

9. The UV curing system of claim 1, wherein each of the plurality of UV light assemblies is configured to emit UVB light energy into the composite structure.

10. An ultraviolet (UV) curing method that is configured to cure a composite structure, the UV curing method comprising:
    adaptively conforming a plurality of UV light assemblies of a UV curing system to a shape of the composite structure;
    coupling spacing caps to the plurality of UV light assemblies;
    spacing the plurality of UV light assemblies a defined distance from the composite structure via the spacing cans; and
    receiving and retaining a portion of an annular ridge of at least one of the spacing caps within an annular groove of at least one other of the spacing caps.

11. The UV curing method of claim 10, further comprising pivotally coupling at least two of the plurality of UV light assemblies together through at least one pivot beam.

12. The UV curing method of claim 10, further comprising pivotally coupling at least one of the plurality of UV light assemblies to a carrier bracket through at least one pivot beam.

13. The UV curing method of claim 12, further comprising providing a handle on the carrier bracket.

14. The UV curing method of claim 10, further comprising:
    reflecting UV light energy into the composite structure with a reflecting interior surface of a drape positioned over and between at least portions of the plurality of UV light assemblies; and
    blocking the UV light energy from emission into an environment surrounding the UV curing system with a light-blocking exterior surface of the drape.

15. The UV curing method of claim 10, further comprising:
    coupling a retainer to protuberances extending from the spacing caps; and
    securely retaining the plurality of UV light assemblies in a fixed position through the coupling.

16. An ultraviolet (UV) curing system that is configured to cure a composite structure, the UV curing system comprising:
    a plurality of UV light assemblies that adaptively conform to a shape of the composite structure, wherein each of the plurality of UV light assemblies comprises a housing coupled to a UV light emitter that is configured to emit UVB light energy into the composite structure;
    a plurality of first pivot beams pivotally coupled between housings of at least two of the plurality of UV light assemblies;
    a carrier bracket including a handle;
    a plurality of second pivot beams pivotally coupled between at least one housing of the plurality of UV light assemblies and the carrier bracket;
    a flexible drape positioned over and between at least portions of the plurality of UV light assemblies, wherein the flexible drape comprises a reflecting interior surface and a light-blocking exterior surface;
    spacing caps coupled to the plurality of UV light assemblies, wherein the spacing caps are configured to space the plurality of UV light assemblies from the composite structure a defined distance, wherein the spacing caps are shaped as circular disks, wherein at least one of the spacing caps includes an annular ridge, and wherein at least one other of the spacing caps includes an annular groove that is configured to receive and retain at least a portion of the annular ridge; and
    a retainer that is configured to couple to protuberances extending from the spacing caps in order to securely retain the plurality of UV light assemblies in a fixed position.

17. An ultraviolet (UV) curing system that is configured to cure a composite structure, the UV curing system comprising:
- a plurality of UV light assemblies that adaptively conform to a shape of the composite structure;
- spacing caps coupled to the plurality of UV light assemblies, wherein the spacing caps are configured to space the plurality of UV light assemblies from the composite structure a defined distance; and
- a retainer that is configured to couple to protuberances extending from the spacing caps in order to securely retain the plurality of UV light assemblies in a fixed position.

18. The UV curing system of claim 17, wherein each of the plurality of UV light assemblies comprises a housing coupled to a UV light emitter.

19. The UV curing system of claim 18, further comprising at least one pivot beam that is pivotally coupled between housings of at least two of the plurality of UV light assemblies.

20. The UV curing system of claim 18, further comprising at least one pivot beam that is pivotally coupled between at least one housing of the plurality of UV light assemblies and a carrier bracket.

21. The UV curing system of claim 20, wherein the carrier bracket comprises a handle.

22. The UV curing system of claim 17, further comprising a flexible drape positioned over and between at least portions of the plurality of UV light assemblies, wherein the flexible drape comprises at least one of a reflecting interior surface and a light-blocking exterior surface.

23. The UV curing system of claim 17, wherein the plurality of UV light assemblies comprises at least three UV light assemblies.

24. The UV curing system of claim 17, wherein each of the plurality of UV light assemblies is configured to emit UVB light energy into the composite structure.

25. An ultraviolet (UV) curing method that is configured to cure a composite structure, the UV curing method comprising:
- adaptively conforming a plurality of UV light assemblies of a UV curing system to a shape of the composite structure;
- coupling spacing caps to the plurality of UV light assemblies;
- spacing the plurality of UV light assemblies a defined distance from the composite structure via the spacing caps;
- coupling a retainer to protuberances extending from the spacing caps; and
- securely retaining the plurality of UV light assemblies in a fixed position through the coupling.

26. The UV curing method of claim 25, further comprising pivotally coupling at least two of the plurality of UV light assemblies together through at least one pivot beam.

27. The UV curing method of claim 25, further comprising pivotally coupling at least one of the plurality of UV light assemblies to a carrier bracket through at least one pivot beam.

28. The UV curing method of claim 27, further comprising providing a handle on the carrier bracket.

29. The UV curing method of claim 25, further comprising:
- reflecting UV light energy into the composite structure with a reflecting interior surface of a drape positioned over and between at least portions of the plurality of UV light assemblies; and
- blocking the UV light energy from emission into an environment surrounding the UV curing system with a light-blocking exterior surface of the drape.

* * * * *